United States Patent [19]
Joshi

[11] Patent Number: 5,578,189
[45] Date of Patent: Nov. 26, 1996

[54] DECOMPOSITION AND REMOVAL OF $H_2S$ INTO HYDROGEN AND SULFUR

[75] Inventor: Ashok V. Joshi, Salt Lake City, Utah

[73] Assignee: Ceramatec, Inc., Salt Lake City, Utah

[21] Appl. No.: 371,160

[22] Filed: Jan. 11, 1995

[51] Int. Cl.⁶ .................... C25B 1/02; C25B 1/00
[52] U.S. Cl. .......... 205/341; 205/412; 205/494; 205/617; 205/633; 205/637; 205/560; 205/444
[58] Field of Search ................... 204/128, 129, 204/105 R, 104, 92, 103; 205/341, 412, 494, 663, 637, 560, 617, 444

[56] References Cited

U.S. PATENT DOCUMENTS

| | | | |
|---|---|---|---|
| 3,249,522 | 5/1966 | Bolmer | 204/92 |
| 3,409,520 | 11/1968 | Bolmer | 204/92 X |
| 4,038,366 | 7/1977 | Fukuda et al. | 204/104 X |
| 4,069,117 | 1/1978 | Cooper | 204/128 X |
| 4,443,424 | 4/1984 | Olson | 423/576.6 |
| 4,544,461 | 10/1985 | Venkatesan et al. | 204/128 |
| 4,772,366 | 9/1988 | Winnick | 204/128 |
| 5,391,278 | 2/1995 | Honna et al. | 205/637 |
| 5,433,828 | 7/1995 | van Velzen et al. | 204/128 |

*Primary Examiner*—Donald R. Valentine
*Attorney, Agent, or Firm*—Trask, Britt & Rossa

[57] ABSTRACT

The method of removing sulfurous compounds (organic and inorganic) from any fluid (gas or liquid) phase by contacting said fluid (gas or liquid) with the reactive metal to form a metal sulfide recovering said fluid (gas or liquid) free from said sulfurous compound and containing compounds free from sulfur and recovering electrochemically said reactive metal from said sulfur to return said metal to elemental form to release elemental sulfur, said separating being done at temperatures above melting point of sulfur.

17 Claims, 6 Drawing Sheets

DECOMPOSITION AND REMOVAL OF $H_2S$ INTO HYDROGEN AND SULFUR

BACKGROUND OF THE INVENTION

1. Field of Invention

This invention relates to the recovery of elemental sulfur and hydrogen from hydrogen sulfide generally contained in hydrocarbon fluids such as petroleum or natural gas. Further, the invention also relates to the removal and decomposition of $H_2S$ from a natural gas stream via an electrochemical process.

2. State of the Art

Generally, hydrogen sulfide is removed from a hydrocarbon stream by solvent extraction followed by distillation. The separated $H_2S$ gas is then converted to elemental sulfur by the widely used Claus process. The Claus process comprises a combustion stage, catalytic conversion stage, and tail gas clean up treatment. The process involves the following three reactions:

$H_2S + 3/2\ O_2 \rightarrow SO_2 + H_2O$ (1) Combustion Stage $2H_2S + SO_2 \rightarrow S + 2H_2O$ (2) Catalytic Stage $3H_2S - 3/2\ O_2 \rightarrow S + 3H_2O$ (3) Overall Recently the National Chemical Laboratory for Industry in Japan, together with Idemitsu Kosan, announced development of a hybrid process which recovers both sulfur and hydrogen from hydrogen sulfide in hydrocarbon stream produced from oil refineries. The Idemitsu hybrid process involves two major operations. Initially, hydrogen sulfide is absorbed into a ferric chloride solution where a redox reaction occurs to convert $H_2S$ and $FeCl_3$ into sulfur, ferrous chloride and hydrochloric acid as follows:

$H_2S(g) + 2FeCl_3(aqueous) \rightarrow 2FeCl_2 + S(s) + 2HCl(Aqueous)$ (4)

After separation of sulfur through filtration, the solution of ferrous chloride ($FeCl_2$) and hydrochloric acid (HCl) is electrolyzed to regenerate ferric chloride in the anodic chamber and produce hydrogen in the cathodic chamber as follows:

$2FeCl_2(Aq.) + 2HCl\ (Aq.) \rightarrow 2FeCl_3 + H_2(g).\ (Aq.)$ (5)

The overall reactions of (4) and (5) can be written as $H_2S(g) \rightarrow H_2(g) + S(s)$ (6)

Thus, the Idemitsu-hybrid process gives hydrogen as a byproduct which has chemical and fuel value and hence makes the process economically advantageous over the Claus process. The Idemitsu process is described in SRI international's document. (PEP Review No. 88-2-1).

However, both the above described processes involve several cumbersome steps to recover sulfur from hydrogen sulfide. In the Claus process, the reactions generate another hazardous chemical, $SO_2$, as an intermediate product and also does not give hydrogen as a byproduct as the Idemitsu hybrid process does. In any event, both of these processes are expensive from energy and capital cost point of view.

Therefore, there is a need in the industry for an improved, one-step process for recovering sulfur from $H_2S$ and preferably directly from natural gas and other petroleum products.

SUMMARY OF THE INVENTION

A process and system have been invented for decomposing and removing $H_2S$ from hydrocarbon fluids such as petroleum products and natural gas.

This process is based on solid electrolyte electrochemical cell technology. A natural or petroleum gas containing $H_2S$ is contacted with a sulfide-forming metal generated via a solid state electrochemical process. The metal ions react with $H_2S$, forming metal sulfide and hydrogen. The metal sulfide so formed is then electrolytically reconverted to the base metal, preferably in situ, by the same electrolytic means by reversing the applied potential polarity on the cell.

In an alternative embodiment, $H_2S$ removal and decomposition from natural and petroleum gas may be achieved in two stages. In a first stage, the extraction (removal) of $H_2S$ is done by a commercially available solvent and distillation process. In a second stage, $H_2S$ is decomposed via a solid electrolytic cell. In this stage, $H_2S$ is contacted with a sulfide-forming metal to convert the metal into metal sulfide, thereby releasing hydrogen gas. The reaction when the sulfide-forming metal is sodium (e.g.) occurs as follows:

$2Na + H_2S \rightarrow Na_2S + H_2$ (7)

The sulfided sodium is then converted to essentially pure sodium and sulfur in an electrolytic cell (FIG. 1) as per the following reaction.

$Na_2S \rightarrow 2Na + \frac{1}{2}S_2$ (8)

It is especially convenient to have an $H_2S$ decomposition unit constructed as an electrolytic cell so that the metal sulfide, e.g., sodium sulfide, may be regenerated in situ to sodium metal. It is desirable, therefore, to employ two $H_2S$ decomposition cells in parallel whereby the units are used alternatingly, i.e. so that the system could be run continuously (FIG. 1).

The $H_2S$ decomposition unit is preferably one which employs a metal ion conductor in which the metal ion has an affinity for sulfur. Sodium, lithium, silver and copper ion conductive materials are the preferable solid electrolytes for $H_2S$ decomposition for two reasons: firstly, these metals readily form sulfides, and secondly, these metal ion conductors are fast ion conductors leading to very efficient device. Preferred operating temperatures are from 100° C. to about 1100° C. depending on the metal ion conductor. The examples of metal ion conductors include sodium and silver conducting Beta and Beta" aluminas, Nasicon, Lisicon, silver iodide, lithium iodide and the like.

DETAILED DESCRIPTION OF INVENTION

The process and apparatus of the instant invention are especially suited for removal of $H_2S$ from liquids or gases, particularly hydrocarbon liquids or gases. Liquids contaminated with $H_2S$ are preferably heated to form a vapor to facilitate processes according to the instant invention.

Figure 1:
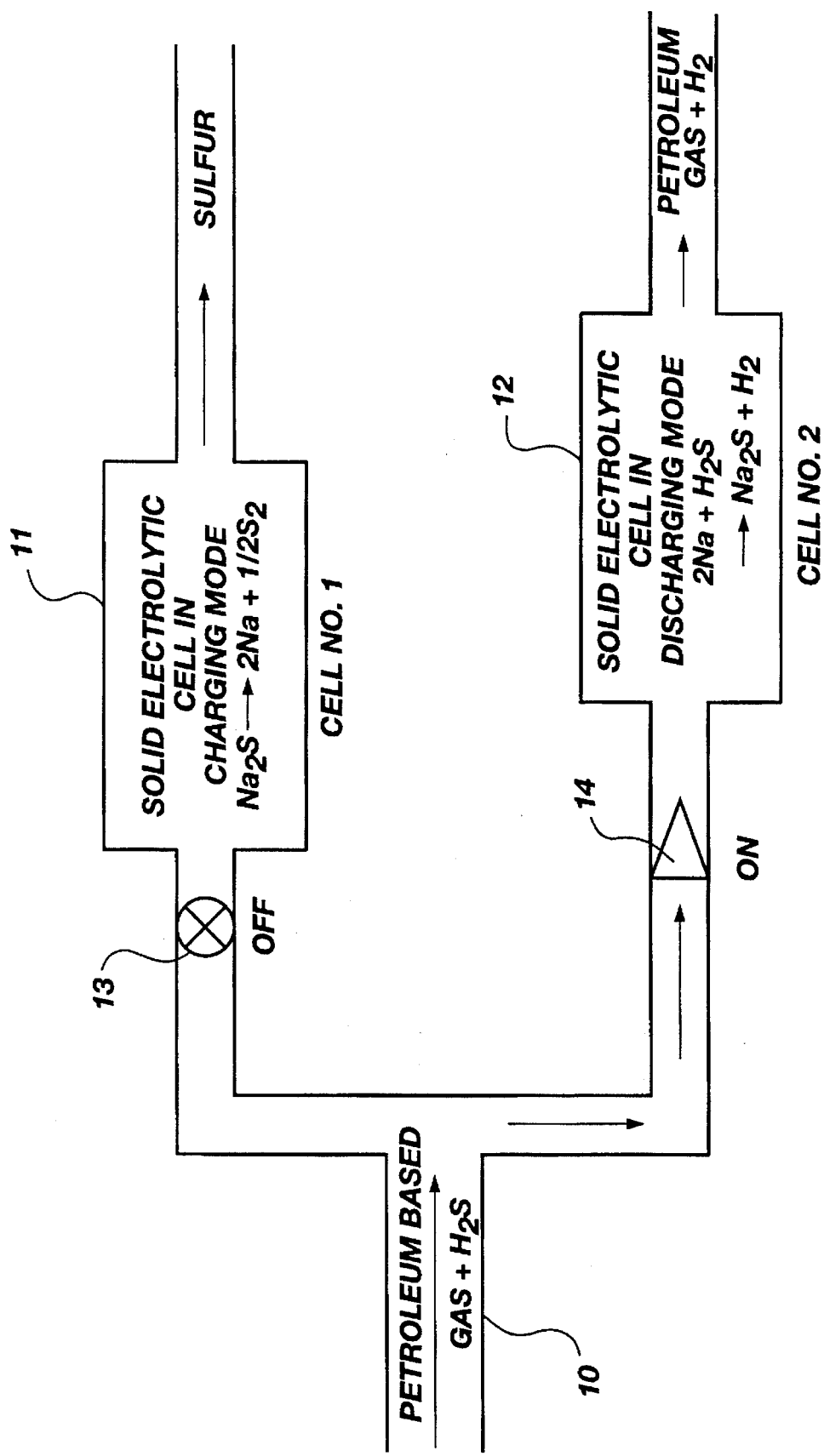
FIG. 1 is a schematic illustration of a pair of electrochemical cells operating in parallel to decompose $H_2S$ and recover sulfur and hydrogen.

A process for removing $H_2S$, as a contaminant, from a gas stream is illustrated in FIG. 1. A petroleum based gas is introduced to the system via conduit 10. A pair of electrochemical cells 11 and 12 are positioned in parallel. Each cell is capable of decomposing $H_2S$ and of being regenerated. Cell 12 is illustrated in a decomposition mode wherein the contaminated gas flows through a tee connection and into a pipe with its valve 14 open to permit the gas to enter cell 12. Meanwhile, cell 11 is in a regeneration mode, being sealed off from the gas stream by closed valve 13.

The decomposition process illustrated in FIG. 1 is thermally self sustaining, since joule heating of the cell via decomposition current flow will keep it at operating temperature without additional heat input from external sources. Typical current densities range from 10 $mA/cm^2$ to 1 $Amp/cm^2$, while applied voltages range from 0.5 volt to 3 volts, depending on the metal used for sulfidation.

The instant invention has many advantages over Claus and Idemitsu hybrid processes; namely, (1) single step process, (2) no additional raw materials, (3) lower capital and operating cost, (4) solid state process and hence longer durability and reliability, (5) hydrogen is recovered as by-product.

This invention has many facets. $H_2S$ from petroleum gas products can be removed directly through a one step solid electrolyte process without going through solvent extraction and distillation steps even if $H_2S$ exists in trace quantities in petroleum based gases. FIGS. 1–5 illustrate the various configurations of solid electrolytic cells used for decomposition and removal of $H_2S$ from petroleum gases.

The system illustrated in FIG. 1 uses a pair of solid electrolyte electrochemical cells in parallel. One cell is utilized to remove hydrogen sulfide from a gas stream, while the other cell is being regenerated. The sodium sulfide formed by reaction with hydrogen sulfide is decomposed during regeneration to return sodium metal to its reactive condition and to release sulfur which is recovered as a liquid at temperatures above the melting point of sulfur (119° C.).

Figure 6:
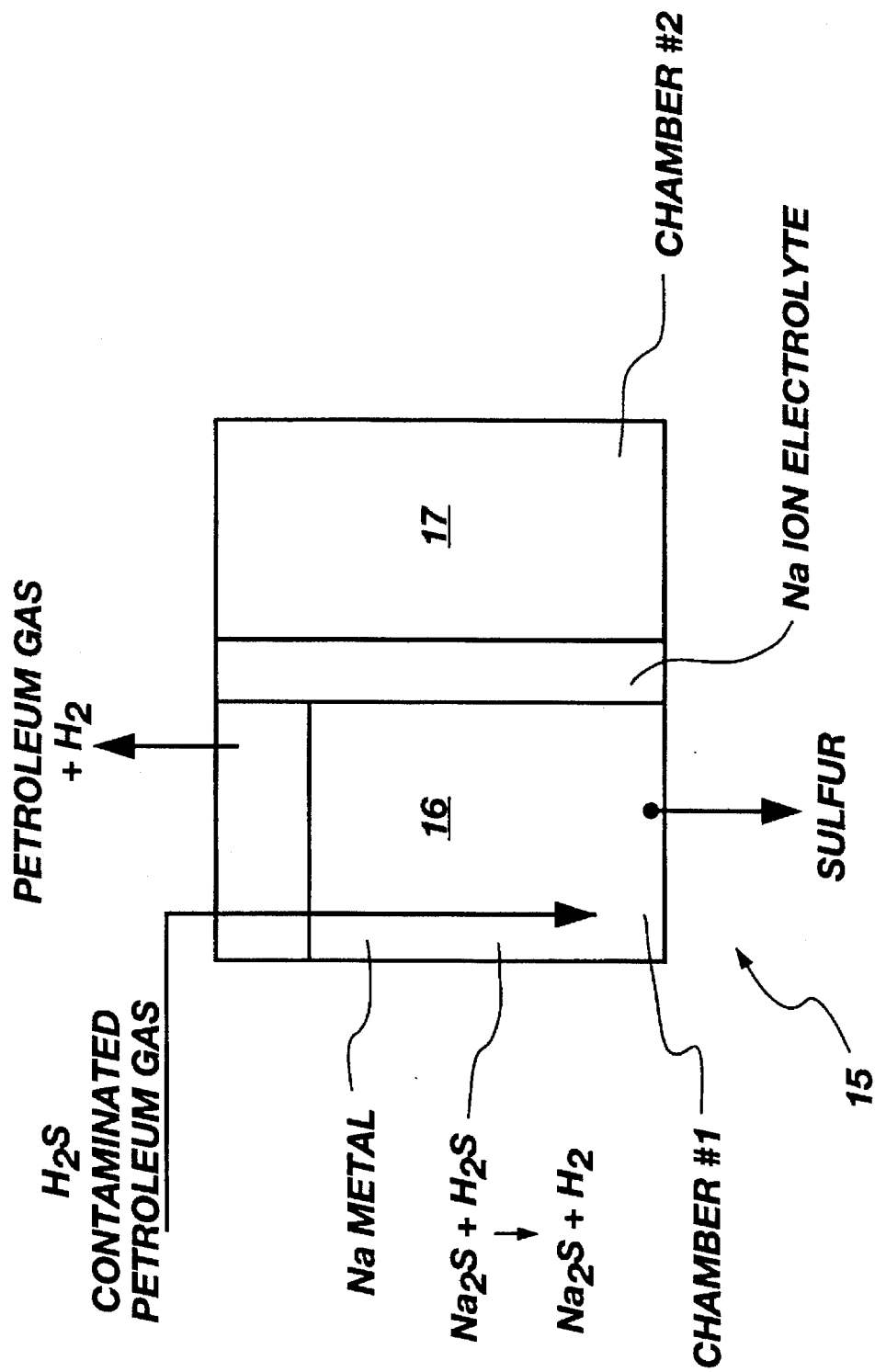
FIG. 6 illustrates a single electrochemical cell for recovering sulfur and hydrogen from a petroleum gas contaminated with $H_2S$.

The solid electrolyte electrochemical cell shown in FIG. 1 has a construction as illustrated in FIG. 6. The cell 15 comprises a first chamber 16 containing sodium metal available for reaction with hydrogen sulfide gas passed through the first chamber to form sodium sulfide and to release hydrogen. Thus, a gas contaminated with $H_2S$ is passed through the first chamber to have the $H_2S$ removed from it. Thus, the first chamber will accumulate sodium sulfide as the reaction proceeds until substantially all the sodium in the first chamber is converted to sodium sulfide.

Once cell 11 of FIG. 1 is exhausted of sodium, then the $H_2S$ contaminated gas is switched to the second cell 12 wherein fresh sodium is available for reaction. While the second cell is operational, the first cell is set in the regeneration mode. During regeneration, $Na_2S$ in the first cell gets converted to sodium metal and elemental sulfur by imposing an applied potential greater than 2 volts. The elemental sulfur is collected from chamber 16 of cell 15 during regeneration as a liquid at temperatures above the melting point of sulfur (119° C.). The active sodium metal formed in chamber 17 of cell 15 is then ready for reaction with $H_2S$ contaminated gas after the second cell has been exhausted of sodium metal. Thus cell 11 and cell 12 can be operated alternatively; while one is being active in terms of removing $H_2S$ from the gas, the other is regenerating sodium metal and removing sulfur simultaneously.

Cells 11 and 12 are identical in construction as are chambers 16 and 17 of a typical cell 15. Cell 11 and cell 12 are structured in the manner of cell 15.

Chamber 16 removes $H_2S$ by its reaction with a reactive metal, e.g. sodium, to form $H_2S$. Hydrogen gas and purified petroleum gas exit chamber 16 during the purification stage. During the regeneration stage, the flow of petroleum gas to chamber 16 is ceased. A d.c. current is applied to the electrodes (not shown) adherent to opposed faces of the sodium ion conducting electrolyte. The current is applied so that the electrode in chamber 16 is positive (anode) and the electrode in chamber 17 is negative (cathode).

As current is applied, metal ions ($Na^+$) flow through the electrolyte from chamber 16 to chamber 17. At the cathode, the $Na^+$ ions combine with electrons to form molten sodium metal in chamber 17. The cell is operated above the melting points of sodium. In chamber 16, sulfur ions ($S^=$) are released from sodium sulfide. The sulfur ions give up their electrons to the anode and form molten sulfur, which may be drawn from the bottom of chamber 16. Once substantially all of the $Na_2S$ has been converted to sodium metal (in chamber 17) and the molten sulfur recovered from chamber 16, the current is turned off and the regenerated cell is ready to be used again to purify (decontaminate by removal of $H_2S$) a petroleum gas stream by introducing it to chamber 17, which is identical in construction to chamber 16. To regenerate chamber 17, the polarity of the d.c. power source is switched so that the electrode of chamber 16 becomes the cathode and metal ions may be transported from chamber 17 to chamber 16. Appropriate valving is used so that both chambers 16 and 17 can be operated in either a purification (decomposition) mode or a regeneration mode.

Figure 2:
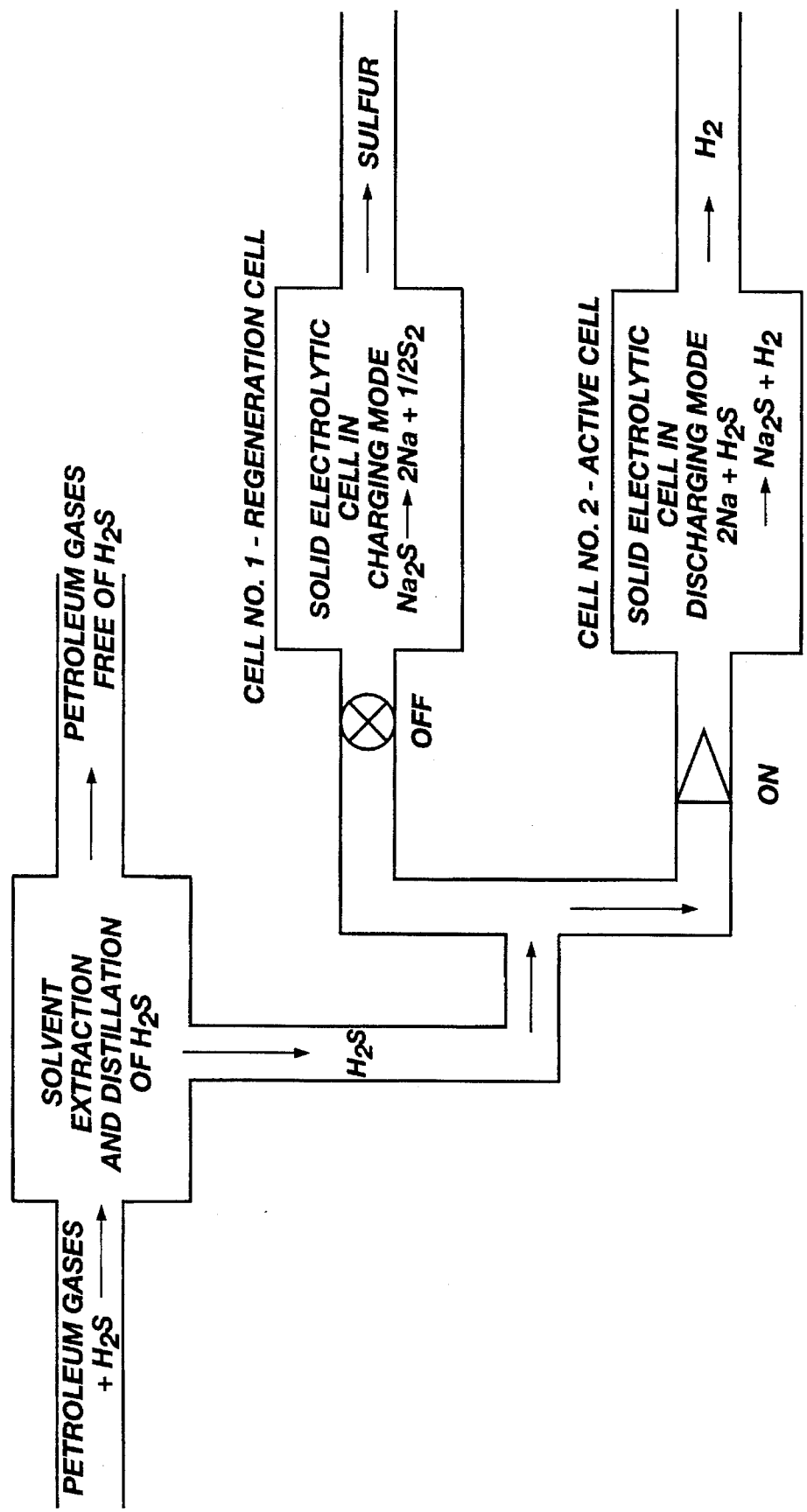
FIG. 2 is a schematic illustration of a solvent extraction system used to remove $H_2S$ from a petroleum gas and to decompose the $H_2S$ and recover sulfur and hydrogen via a pair of electrochemical cells.

The system illustrated in FIG. 2 is very similar to that illustrated in FIG. 1, except that the carrier gas, i.e., illustrated as a petroleum gas containing hydrogen sulfide as a contaminant, has first gone through a solvent extraction and distillation system of the type being currently commercially utilized, wherein hydrogen sulfide is released as substantially pure gas as from the distillation stage. The substantially pure hydrogen sulfide is then directed toward a pair of electrochemical cells utilized alternatively as in FIG. 1. The cells of the type similar to FIG. 1 may be utilized in this system.

Figure 3:
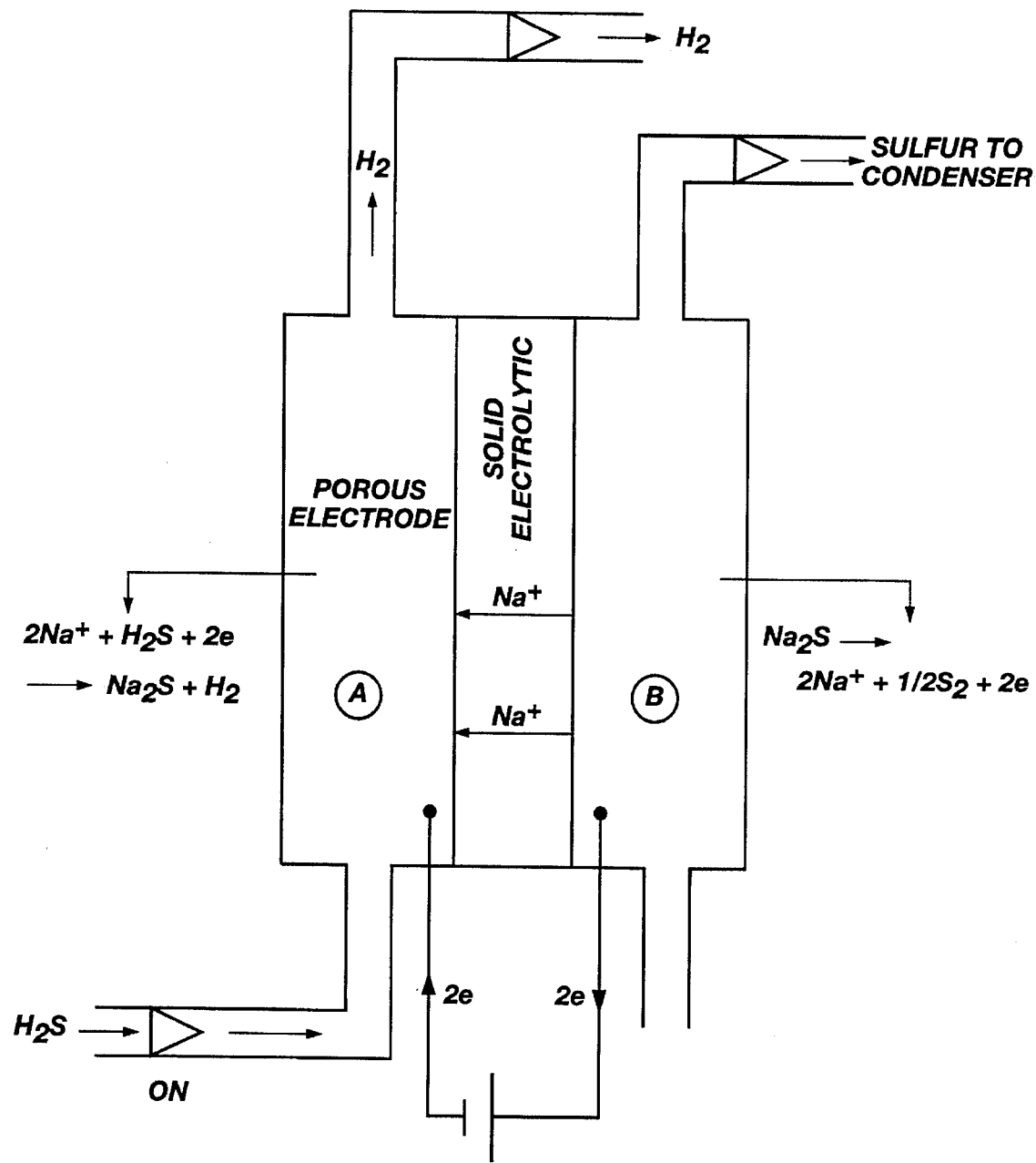
FIG. 3 illustrates a single solid electrolytic cell for decomposition of $H_2S$ and recovery of sulfur and hydrogen.

FIG. 3 illustrates a single cell which is used continuously for removal of hydrogen sulfide, carrier gas such as a natural gas or petroleum gas. Construction of the cell is similar to that of FIG. 6; however, the cell sizing must be such that sodium is recovered at about the same rate that it is consumed in the hydrogen sulfide removal process. Thus, in the first compartment of the cell (FIG. 3), the hydrogen sulfide containing gas is reacted with sodium to form hydrogen sulfide. Sodium ions are continually fed through the solid electrolyte from compartment two, which is separate from compartment one. The reaction is:

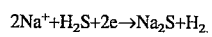

$$2Na^+ + H_2S + 2e \rightarrow Na_2S + H_2$$

In the second compartment, sodium sulfide is decomposed to yield two sodium ions, one mole of sulfur and two electrons. The sodium ions are directed through the solid electrolyte through compartment two to compartment one, which in this phase of operation is the cathode compartment. Sodium ions must be pumped through the solid electrolyte at substantially the same rate as hydrogen sulfide is introduced. That is, for every mole of hydrogen sulfide coming into the first compartment, that is, the cathode compartment, two moles of sodium ions must become available through the solid electrolyte for reaction purposes. When the first compartment has been significantly filled with the sodium sulfide, the valving is reversed and the current is reversed so that the second compartment becomes the cathode compartment and the sodium sulfide, which has accumulated in the first compartment, is then decomposed to produce sodium ions. The process continues for removal of hydrogen sulfide, which is now being directed to the second compartment. Thus, in this system, the cathode compartment is the hydrogen sulfide decomposition compartment and generates hydrogen and sodium sulfide. The hydrogen carries over with the carrier gas being treated. In the anode compartment, sodium ions and liquid sulfur are produced from sodium sulfide since the electrochemical cell is maintained above the melting point of sulfur. Thus, a single cell may be used in a continuous operation.

Figure 4:
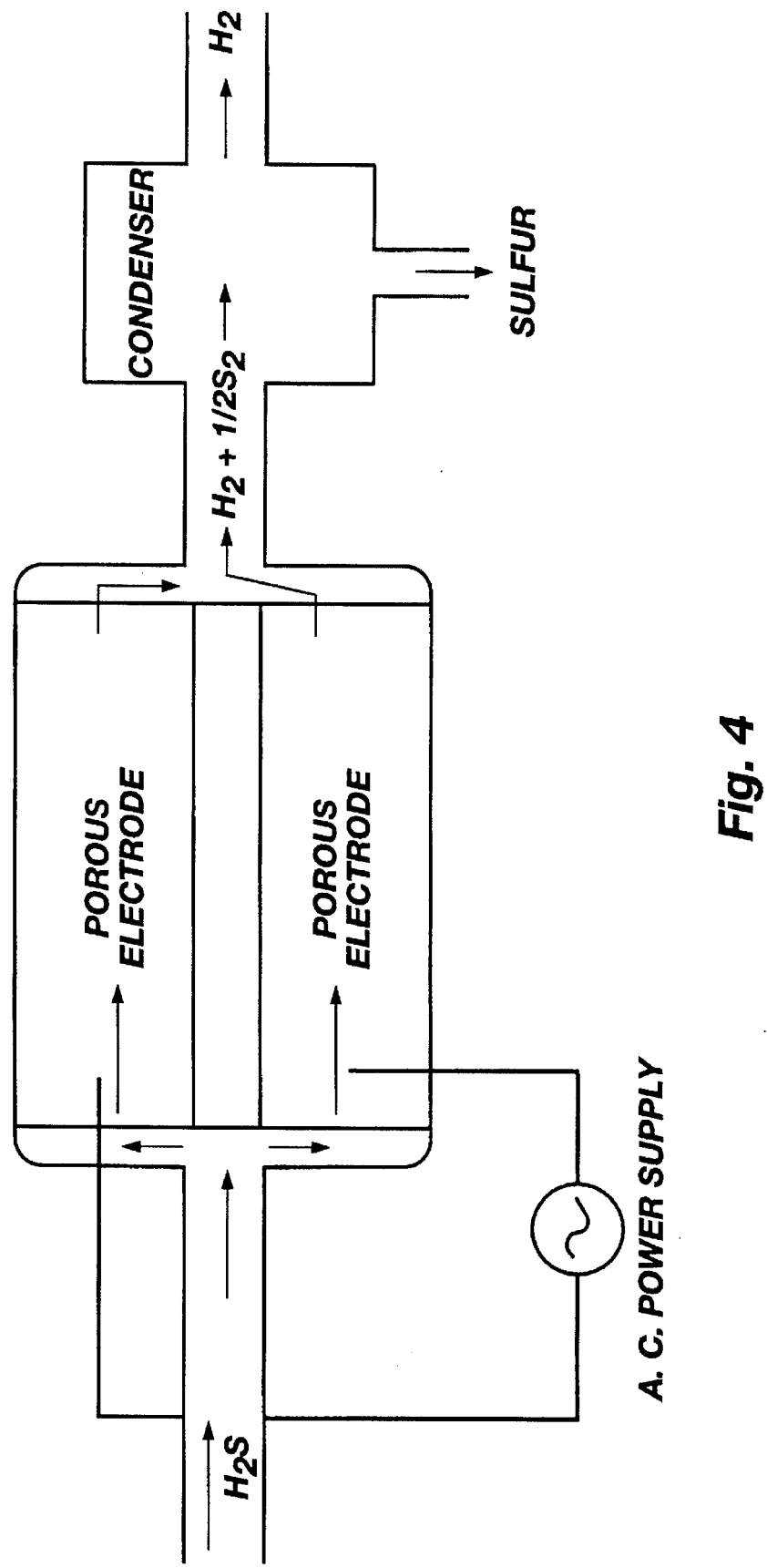
FIG. 4 illustrates an electrolytic cell similar to the cell of FIG. 3 wherein the cell is powered by an alternating current.

Another system for utilizing a single cell in a continuous operation is illustrated schematically in FIG. 4. FIG. 4 involves a sodium ion conductor sandwiched between a pair of porous electrodes. The electrodes are attached to an alternating current power supply and the whole electrode ion-conductor sandwich is contained in a glass-type enclosure in which a hydrogen sulfide containing gas is introduced. Preferably, the gas must pass through the porous electrodes before it is discharged at an outlet from the system enclosure. Hydrogen sulfide containing gases are introduced into the cell while exiting are the carrier gas, hydrogen and sulfur as a vapor or liquid. A condenser is positioned in the discharge line and operated at a temperature below the boiling point of sulfur to condense all sulfur vapor and recover it as a liquid.

The electrochemical cell is operated at a temperature above the melting point of the sulfur. The electrodes act alternatively as a cathode and then an anode. The AC power supply may be a conventional 60 hertz power supply wherein the cycling of current direction reverses 60 times per second. Hydrogen sulfide reacts with sodium on the surface of the electrolyte (sodium ion-conductor) to form sodium sulfide. Hydrogen is released. Upon reversal of the current, sodium sulfide is decomposed to again form sodium and sulfur. Since hydrogen and sulfur do not react with one another at temperatures less than about 300° C., they can be separated by this type of system.

The sulfur is maintained in the molten state by operating the temperature of the electrochemical cell at above the melting point of sulfur. Preferably the cell operates at a temperature between about 100° C. and 300° C. Sulfur liquid is carried over with the carrier gas into the discharge system, along with the hydrogen that has been generated by the cell. A condenser in the discharged line is operated at a temperature below the boiling point of sulfur to condense sulfur vapor. The porous electrodes in such an electrochemical cell may be graphite, molybdenum, tungsten, iron, titanium and the like.

Figure 5:
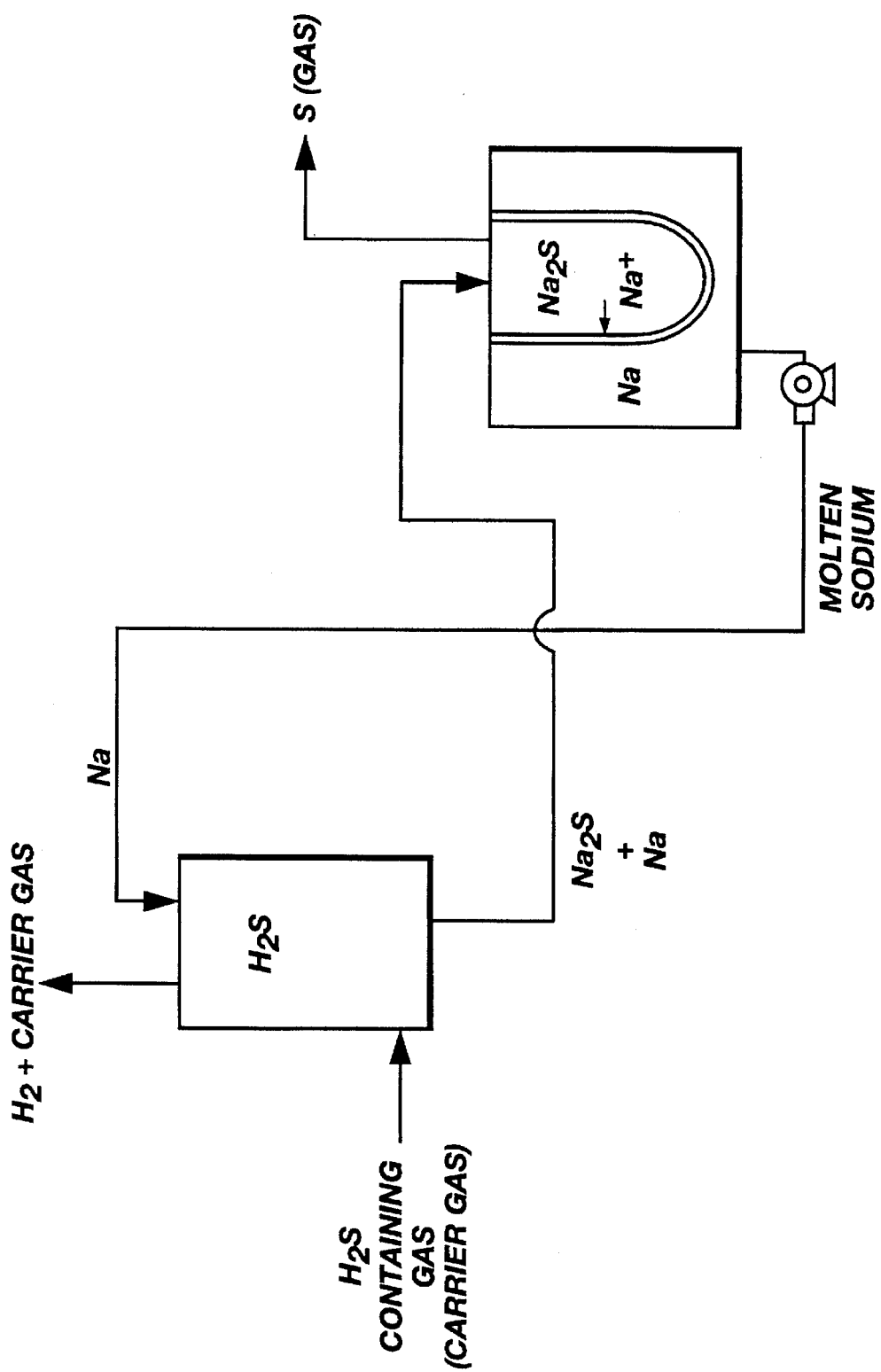
FIG. 5 illustrates a molten sodium scrubber to convert $H_2S$ to $Na_2S$ and an electrolytic cell to decompose $Na_2S$ and recover sulfur and sodium.

Another continuous method of removing hydrogen sulfide from a carrier gas, such as natural gas or petroleum gas, is illustrated in FIG. 5, wherein hydrogen sulfide is contacted with molten sodium in a scrubbing unit. Sodium sulfide is formed in the scrubber and removed from the bottom of the scrubber and transported, i.e., by gravity flow or by a pump, to an electrochemical cell containing a sodium ion conductor (electrolyte) wherein the sodium sulfide is decomposed into sulfur liquid or vapor by operation of the electrochemical cells above the melting point of sulfur. Sodium ions are transported through the electrolyte into a cathode compartment, wherein molten sodium is recovered and transported via a pump back to the top of the scrubber unit. Exiting from the top of the scrubber unit is the carrier gas.

In order to remove all the hydrogen sulfide, it is as generally preferred to operate with an excess of sodium, that is, above stoichiometric requirements, in the scrubbing units so that some sodium is recycled along with sodium sulfide to the electrode chemical cell. Systems of the type just described may be operated in a manner to remove upwards of 100 tons a day of hydrogen sulfide from a carrier gas system. Also, the above systems may be made in small sizes to remove very small amounts of hydrogen sulfide from a carrier gas at a point-of-use site or at a production facility in the event that the quantity of hydrogen sulfide is small in comparison to the volume of the gas stream.

The invention is described herein primarily with reference to its use as a system for purifying a gas. That is, undesirable hydrogen sulfide is removed from a carrier gas stream in which hydrogen sulfide is considered a contaminant. However, it should be understood that the instant invention may be utilized as a method of producing hydrogen and sulfur from a hydrogen sulfide feed stock and that the system may work very effectively with a gas stream which is 100% hydrogen sulfide. The exact structure of a system designed to decompose 100% hydrogen sulfide could be the same or differently structured than one which was designed to remove hydrogen sulfide as a contaminant in a carrier gas. Also, the systems in the invention may be utilized in relation to one another, i.e, an electrochemical cell of the type described in FIGS. 3 or 4, which are continuous operation cells, could be used in conjunction with one another in series. The sodium scrubber process illustrated in FIG. 5 could be used in conjunction with the electrochemical cells of FIG. 3 or FIG. 4, wherein one system is used as a rough removal system, i.e, designed to remove up to perhaps 50% of the hydrogen sulfide present, while the other unit is used as a final or finish cleanup unit wherein the presence of hydrogen sulfide may be at a value close to zero.

Although not illustrated in all the figures hereinabove, it is generally recognized that, at high gas flow rates through a particular system, there is some probability that sodium vapors or liquid droplets of sodium are carded over into the discharge stream. Thus, it is generally desirable to have a condenser in any discharge stream in which vaporized molten reactive metal, such as sodium, may exist.

The detailed description of the invention considered only Na ion conductors. However, the instant invention encompasses use of silver, copper and lithium ion conductors.

The system of the invention may also be utilized to remove such noxious gases, such as oxides of nitrogen, ($NO_2$, $NO$, $N_2O$) or sulfur ($SO_2$, $SO_3$) to form various types of gas streams. For example, the system of FIG. 5 may be utilized when the reactive metal in place of sodium may be lithium, which is quite reactive with nitrogen and especially in the absence of oxygen. Nitrous oxide, for example, may be contacted in a scrubbing unit with molten lithium to form both lithium oxide and lithium nitride. The lithium nitride and lithium oxide may be decomposed to lithium, nitrogen gas and oxygen gas by electrochemical cells similar to that shown in FIG. 5. At typical temperatures of operation of such cells, i.e., generally below 500° C. and frequently below 400° C. or even 300° C., nitrogen and oxygen do not react with one another so that what had been a noxious gas, $N_2O$, can be decomposed via such a system to the majority components of air, that is, nitrogen and oxygen.

The system of this invention can be also utilized to decompose $CO_2$ gas into oxygen and CO or oxygen and $CO_2$. This has direct application in convening Lunar and Mars $CO_2$ environment into useful oxygen production. This oxygen will be used as the propellant for the return leg of the mission. $CO_2$ will react with metals like sodium and lithium to form sodium oxide and carbon or sodium oxide and carbon monoxide, depending on the chemical conditions. The sodium oxide so formed can be regenerated into metal by solid electrolyte process using sodium ion conducting electrolyte generating pure oxygen in the process.

Other nitrogen carbon compounds in gaseous form could be similarly treated, as well as other sulfur compounds in gaseous form. Various types of beta-alumina electrolytes may be utilized, such as sodium beta"-alumina or lithium beta"-alumina or silver beta"-alumina and the like. Also, such lithium and sodium conductors such as NASICON and LISICON, which are of the sodium zirconium silicon phosphate oxide family, may be utilized. Other conductors, such as silver halides and iodide, and cuprous halides, such as cuprous iodides, cuprous chloride, silver and cuprous bromide, may also be utilized. The NASICON materials, in which the sodium may be replaced by lithium or another alkaline metal, are represented by the formula $Na_{1+x}Zr_2P_{3-x}Si_xO_{12}$, wherein the maximum conductivity is achieved around a composition of x=2, which gives $Na_3Zr_2PSi_2O_{12}$. Other lithium conductors may be used. Other lithium conductors include lithium iodide, especially if lithium iodide contains calcium iodide, also lithium aluminum chloride (Li Al $Cl_4$), $LiI-Al_2O_3$ composites containing 35 to about 40% alumina, that is, lithium iodide, wherein the percentage is in mole percent and $LiCl.KCl.LiBr.MgO$ and $LiX.Al_2O_3$ where X is Cl, Br or I. Silver ion conductors may be AgX wherein X is Cl, Br or I or $RbAg_4I_5$. Copper ion conductors may be $Rb_2Cu_3Cl_4$, copper-β" alumina or CuX wherein X is Cl, Br or I. The electrolyte characteristics should be such that the reactive ion is a very mobile ion and that the electrolyte is thermodynamically stable and has sufficient structural integrity to endure in an electrochemical cell operated at temperatures up to about 500° C.

What is claimed is:

1. A method of removing and decomposing $H_2S$ as a contaminant in a carrier gas stream comprising contacting said carrier gas with a solid metal ion conducting electrolyte wherein said metal is a sulfide forming metal under metal ion conducting conditions to react said metal with $H_2S$ from said carrier gas under metal sulfiding conditions, recovering $H_2S$ free carrier gas containing $H_2$, electrolytically converting said metal sulfide to reform said metal and recovering sulfur.

2. The method of claim 1, wherein said electrolytically converting of said metal sulfide is done in situ.

3. The method of claim 2, wherein said electrolytically converting of said metal sulfide to regenerate said sulfide forming metal is done concurrently with reaction of $H_2S$ with said metal resulting in the formation of metal sulfide.

4. The method of claim 1, wherein said electrolyte is maintained at a temperature up to about 500° C.

5. The method of claim 1, wherein said solid electrolyte exists in the electrochemical cell.

6. The method of claim 1, wherein sulfide forming metal is selected from the class consisting of sodium, lithium, copper and silver and their alloys and composites.

7. The method of claim 1, wherein metal ion conducting electrolyte is a sodium, lithium, copper or silver ion conducting electrolyte.

8. The method of claim 1, wherein the hydrocarbon gas can be replaced by hydrocarbon fluid.

9. The method of claim 1, wherein the $H_2S$ can be replaced by sulfur containing organic and inorganic compounds.

10. The method of claim 1 wherein said solid metal ion conducting electrolyte is an electrolyte selected from the class consisting of:

sodium ion conductors selected from the group consisting of sodium β" alumina, sodium conductors of the formula $Na_{1+x}Zr_2P_{3x}Si_xO_{12}$ and sodium conducting gases;

lithium ion conductors selected from the class consisting of lithium β" alumina, lithium conductors of the formula $Li_{1+x}Zr_2P_{3x}Si_xO_{12}$, $LiCl.KCl.LiBr.MgO$ and $LiX.Al_2O_3$ where X is chlorine, iodine or bromine;

silver ion conductors selected from the class consisting of silver β" alumina, silver conductors of the formula $AgX.Al_2O_3$ wherein X is chlorine, iodine or bromine and $RbAg_4I_5$ and copper ion conductors selected from the class consisting of copper β" alumina, and copper conductors of one formula $CuX.H_2O$ wherein X is chlorine, bromine or iodine and $Rb_2Cu_3Cl_4$.

11. The method of decomposing $H_2S$ contained in a carrier gas comprising contacting said $H_2S$ directly with a sulfide forming metal under metal sulfide forming conditions to form a metal sulfide and hydrogen and electrolytically converting said metal sulfide to reform into metal.

12. The method of claim 1, wherein said carrier gas can be any hydrocarbon gas containing $H_2S$.

13. The method of claim 1, wherein said reaction of $H_2S$ with metal and said electrolytically converting of metal sulfide to metal is done concurrently, by means of alternating current power supply, decomposing $H_2S$ into $H_2$ and sulfur simultaneously.

14. The method of claim 1, wherein the electrochemical cell consists of porous electrodes made of either carbon, graphite, nickel, molybdenum, titanium, tungsten or Fe-chromium alloys.

15. A method of removing a contaminant gas from a fluid stream wherein said contaminant gas is a halide, oxide, hydride or chalcogenide compound containing an anion of an elemental gas comprising:

contacting said contaminant gas containing fluid with a reactive metal to form a metal cation which combines with said anion elemental gas;

recovering said fluid substantially free of said contaminant gas and containing said elemental gas; and separating electrochemically said reactive metal from said gas anion by passing cations of said metal through a solid ion conducting electrolyte to return said metal to elemental form and to release elemental anions of said gas, said separating being conducted at a temperature above wherein the said anion element is a liquid.

16. A method of removing $H_2S$ from a hydrocarbon gas and/or vapor comprising:

contacting said $H_2S$ with a reactive metal to form a metal sulfide and hydrogen;

recovering said hydrocarbon gas and/or vapor free from $H_2S$ and containing hydrogen; and separating electrochemically said reactive metal from said sulfur to return said metal to elemental form and to release elemental sulfur, said separating being done at temperatures above the melting point of sulfur.

17. A method of decomposing $CO_2$ or $SO_2$ comprising:

contacting said $CO_2$ or $SO_2$ gas with a reactive metal which forms metal oxide and carbon or sulfur under metal oxide forming conditions and electrolytically converts said metal oxide to reform it into said reactive metal while recovering oxygen.

\* \* \* \* \*